United States Patent [19]

Kemp

[11] Patent Number: 4,832,828

[45] Date of Patent: May 23, 1989

[54] HYDROTREATING WITH CATALYSTS PREPARED FROM HYDROGELS

[75] Inventor: Richard A. Kemp, Stafford, Tex.

[73] Assignee: Shell Oil Company, Houston, Tex.

[21] Appl. No.: 84,721

[22] Filed: Aug. 13, 1987

Related U.S. Application Data

[62] Division of Ser. No. 924,091, Oct. 28, 1986, Pat. No. 4,717,698.

[51] Int. Cl.$^4$ .............................................. C10G 45/08
[52] U.S. Cl. ......................... 208/216 PP; 208/251 H; 208/254 H
[58] Field of Search ............... 502/210, 211, 213; 423/628; 208/216 R, 216 PP, 251 H, 254 H

[56] References Cited

U.S. PATENT DOCUMENTS

| | | | |
|---|---|---|---|
| 4,003,828 | 1/1977 | Eberly, Jr. ..................... | 208/251 H |
| 4,019,978 | 4/1977 | Miller et al. ..................... | 502/211 |
| 4,534,852 | 8/1985 | Washecheck et al. ......... | 208/251 H |
| 4,629,717 | 12/1986 | Chao ................................. | 502/210 |

*Primary Examiner*—Paul E. Konopka
*Attorney, Agent, or Firm*—Pamela J. McCollough

[57] ABSTRACT

Hydrotreating with catalysts prepared by incorporating a metals solution containing cobalt and an element selected from the group consisting of molybdenum, tungsten and mixtures thereof, into a phosphated alumina hydrogen support. The final calcined catalysts have surface areas greater than about 300 m$^2$/g, flat plate crush strengths greater than about 16 lbs and more than about 80% of their pore volume in pores having diameters less than about 70 Å.

42 Claims, No Drawings

HYDROTREATING WITH CATALYSTS PREPARED FROM HYDROGELS

This is a division, of application Ser. No. 924,091, filed Oct. 28, 1986, now U.S. Pat. No. 471,698

FIELD OF THE INVENTION

This invention relates to a process for preparing highly active phosphated alumina hydrogel-derived catalysts.

BACKGROUND OF THE INVENTION

In the catalytic processing of petroleum feedstocks, it is often desirable to alter the pore structure of the catalyst in order to accommodate different types of feeds. For example, when processing feedstocks of high metals content, the metals tend to deposite rapidly on the catalyst surface and plug the pores of conventional hydroprocessing catalysts, resulting in a loss of catalytic activity for sulfur and nitrogen removal. To facilitate the diffusion of large components into and out of the catalyst and to prevent surface deposits of coke and metals, large pore diameters are required. On the other hand, when processing feedstocks with no metals or with low metals contents, it may be technically and economically desirable to use narrow-pore catalysts.

Related cases include co-pending applications Ser. No. 924,092, filed Oct. 28,1986, now U.S. Pat. No. 4,716,140 and Ser. No. 924,227, filed Oct. 28, 1986, now U.S. Pat. No. 4,717,707, which are directed to catalysts prepared by the incorporation of metals solutions into hydrogels.

SUMMARY OF THE INVENTION

The present invention relates to a process for the preparation of hydrotreating catalysts containing cobalt and an element selected from the group consisting of molybdenum, tungsten and mixtures thereof, incorporated into an alumina/aluminum phosphate hydrogel-drived support. The catalyst is prepared by a process which comprises:

(a) titrating an aqueous solution of an acid aluminum salt and an aqueous solution of a basic aluminum compound in the presence of a phoshporus-containing compound, thereby forming a precipitate, (b) aging the precipitate at a temperature ranging from about 20 C. to about 90° C. for at least about 15 minutes at a pH ranging from about 8.0 to about 12.0, (c) washing the precipitate, (d) mixing the precipitate with a solution containing solubilized salts of cobalt and a heavy metal selected from the group consisting of molybdenum, tungsten and mixtures thereof, at a pH in the range between about 4.0 and about 8.0 and a temperature in the range between about 25° C. and about 100° C. until adsorption of the metal salts onto the gel is sufficient to yield a final catalyst having from about 1%w to about 5%w cobalt and from about 8%w to about 32%w heavy metal, (e) extruding the product of step (d), and (f) drying and calcining the product of step (e) at a temperature ranging from about 300° C. to about 900° C.

It has been found that the use of phosphorus-containing hydrogels gives catalysts having activities equal to or better than catalyst prepared by conventional impregnation techniques when compared on a volumetric basis while having densities significantly lower than conventionally prepared catalysts. Two of the major advantages of the hydrogel route are higher metals utilization and lower costs of catalyst manufacture. The catalysts prepared according to the invention have high surface areas, greater than about 300 m$^2$/g; high crush strengths, greater than about 16 lbs; and substantial portions, greater than about 80%, of their pores with diameters less than about 70 Å. These catalysts are particularly useful for hydrotreating applications.

DESCRIPTION OF THE PREFERRED EMBODIMENTS

In the process of the instant invention, a highly active hydrotreating catalyst is prepared by incorporating a metals solution containing cobalt and an element selected from the group consisting of molybdenum, tungsten and mixtures thereof, into a phosphated alumina hydrogel-derived support prepared by titrating an aqueous solution of an acid aluminum salt and a phosphorus-containing compound with an aqueous solution of a basic aluminum compound.

The phosphated alumina hydrogel can be prepared by titrating an aqueous solution of one or more aluminum salt(s) with an appropriate acidic or basic material or solution in the presence of a phosphorus-containing compound to cause precipitation of the phosphated alumina gel. One skilled in the art will recognize that the alumina gel can be prepared by titrating an acidic aluminum salt such as, for example, aluminum sulfate, aluminum nitrate or aluminum chloride, in aqueous solution with a basic precipitating medium such as, for example, sodium hydroxide or ammonium hydroxide, in the presence of a phosphorus-containing compound, or, by titrating an alkali metal aluminate such as, for example, sodium aluminate or potassium aluminate, in aqueous solution with an acidic precipitating medium such as, for example, hydrochloric acid or nitric acid, in the presence of a phoshorus-containing compound. One skilled in the art will recognize that the adjustment of the pH of an aluminum-containing solution to between about 5.5 and about 10.0 will result in precipitation of the aluminum as aluminum hydroxide or hydrated aluminum oxide.

In a preferred embodiment, the phosphated alumina hydrogel is prepared by titrating an aqueous solution of an alkali metal aluminate and an aqueous solution of acid aluminum salt, at least one of which contains a phosphorus-containing compound dissolved therein, to cause precipitation of the phosphated alumina gel. Suitable acidic aluminum salts include aluminum sulfate, aluminum nitrate and aluminum chloride. A preferred species is aluminum chloride. Suitable alkali metal aluminates are sodium aluminate and potassium aluminate. The precipitation can be carried out by adding an aqueous solution of the basic aluminum species to an aqueous solution of the acidic aluminum species or the procedure can be reversed by adding an aqueous solution of the acidic aluminum species to an aqueous solution of the basic aluminum species (referred to as "sequential precipitation"). Preferably, the precipitation in the instant invention is carried out by simultaneously adding the acid aluminum species and the basic aluminum species, at least one of which has a phosphorus-containing compound dissolved therein, to cause precipitation of the hydrogel (referred to as "simultaneous precipitation").

As used herein, the term "a phosphorus-containing compound" is generic and refers to one phosphorus-containing compound as well as more than one phosphorus-containing compound. The phosphorus-containing compound is generally selected from the group consisting of phosphoric acid, a phosphate salt and mixtures thereof. Suitable phosphate salts include alkali metal phosphate, alkali metal hydrogen phosphate, ammonium phosphate and ammonium hydrogen phosphate. The phosphorus-containing compound is preferably phoshporic acid and is preferably mixed with the acid aluminum species prior to the precipitation. Alternatively, the phosphorus-containing compound can be sodium or ammonium phosphate and mixed with the basic aluminum species prior to precipitation. The phosphorus-containing compound can also be added as a separate solution or added to both the acid aluminium species and the basic aluminum species without significantly affecting the results. In a preferred embodiment, the phosphorus-containing compound is prepared using commercially available 85% phosphoric acid although other phosphorus-containing materials may be utilized. The amount of phosphorus-containing compound added to the acid aluminum species and/or the basic aluminum species is from about 0.06 to about 0.30 moles of phosphorus per mole of aluminum.

The temperature and pH of the precipitation are important variables in the preparation of the aluminas into which metals solutions can be incorporated to form hydrotreating catalysts with desirable physical qualities. Changes in precipitation temperatures and pHs result in changes in porosities. In the instant invention, a precipitation temperature typically ranges from about 20° C. to about 90° C. preferably from about 50° C. to about 85° C., and a precipitation pH typically ranges between about 5.5 and about 10.0, preferably between about 5.5 and about 8.0, and more preferably between about 6.0 and about 7.5. The length of time required for the precipitation step is not critical. However, the maximum rate of addition of the acid aluminum species and the basic aluminum species is fixed by the rate at which the two streams can be mixed and the pH and temperature of the system can be effectively controlled.

After the precipitation step is completed, the pH of the slurry is adjusted by the addition of the basic aluminate solution to fall in the range from about 8.0 to about 12.0, preferably about 9.0 to about 11.0, most preferably about 9.5 to about 10.5, and aged at a temperature in the range from about 20° C. to about 90° C., preferably about 50° C. to about 85° C. for at least about 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all of the salts formed during the precipitation of the hydrogel which can be removed by washing. The preferred solvent for washing is water although other solvents such as lower alkanols may be utilized.

After washing, the hydrogel is reslurried with a solution containing solubilized salts of cobalt and a heavy metal selected from the group consisting of molybdenum, tungsten and mixtures thereof, sufficient to deposite on the final catalyst from about 1%w to about 5%w cobalt and from about 8%w to about 18%w molybdenum or about 10%w to about 32%w tungsten. When mixtures of molybdenum and tungsten are utilized, the final catalyst contains about 8%w to about 32%w molybdenum and/or tungsten. Alternatively, the solution may contain amounts of cobalt and molybdenum and/or tungsten in excess of that required to deposit the aforesaid amounts of metals, which excess may be removed by washing following the reslurry step. A typical metals solution can be prepared by combining a molybdenum solution with a cobalt solution. In a preferred embodiment, the metals solution contains a stabilizing amount of a phosphorus-containing compound. Typically, the metals solution contains an amount of phosphorus in the range from about 0.2 to about 1.5 moles of phosphorus per mole of molybdenum and/or tungsten. The phosphorus-containing compound is generally selected from the group consisting of phosphoric acid, a phosphate salt and mixtures thereof.

The molybdenum solution consists of a water-soluble source of molybdenum such as ammonium heptamolybdate or ammonium dimolybdate dissolved in water. Hydrogen peroxide may also be used to aid in solution preparation in some cases. A preferred method for preparing the molybdenum solution consists of adding hydrogen peroxide to the solution in the range of about 0.1 to about 1.0 mole of hydrogen peroxide per mole of molybdenum. Optionally, a suitable soluble amine compound such as monethanolamine, propanolamine or ethylenendiamine may be added to the molybdenum solution in order to aid in stabilization of the solution.

The tungsten solution typically consists of ammonium metatungstate dissolved in water. A preferred method for preparing the tungsten solution consists of adding hydrogen peroxide to the solution in the range of about 0.1 to about 1.0 mole of hydrogen peroxide per mole of tungsten. In addition, a suitable soluble amine compound such as monoethanolamine, propanolamine or ethylene diamine may be added to the tungsten solution in order to aid in stabilization of the solution.

The cabalt solution consists of cobalt salts dissolved in water and optionally, a phosphorus-containing compound. A wide range of cobalt compounds are suitable, such as cobalt nitrate, cobalt hydroxide, cobalt acetate, cobalt oxalate, or cobalt oxide. The preferred cobalt compound is cobalt nitrate.

The temperature and pH of the reslurry step are important variables in the preparation of hydrogel-derived catalysts which have acceptable densities and porosities. The temperature of the reslurry step affects the catalysts only when the metals solution contains phosphorus with the trend being for higher temperatures to yeild lower density catalysts. The pH of the reslurry step, however, is critical to the formation of catalysts having the desired properties. The reslurry of the hydrogel support with the metals solution is carried out at a pH in the range between about 4.0 and about 8.0, preferably between about 4.0 and about 6.0, adjusting to these pH ranges by adding, if necessary, acid or base to the hydrogel, the metals solution and/or the mixture of the slurry and the metals solution, and a temperature in the range between about 25° C. and about 100° C., preferably between about 25° C. and about 80° C., until adsorption of the metals salts onto the gel is sufficient to yield a final calcined catalyst having from about 1%w to about 5%w cobalt and from 8%w to about 18%w molybdenum or from about 10%w to about 32%w tungsten. Reslurry pHs lower than about 4.0 result in dissolution of the alumina gel and pHs greater than about 8.0 result in failure of the molybdenum or tungsten to absorb onto the gel. Typically, the times for reslurry will range from about 0.5 to about 2 hours. Optionally, the resulting material can be washed to remove unadsorbed metals and filtered in routine fashion.

Following the reslurry step, the material may be extruded and then dried and calcined; dried, mulled with addition of water, extruded or pelleted and calcined; or partially dried, extruded or pelleted, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

In a preferred embodiment, the material is extruded and then dried. Alternatively, the material may be extruded after drying to the proper loss on ignition (LOI). However, to facilitate extrusion, organic binders and/or lubricants may be added prior to extrusion.

After drying, the material is calcined to produce the finished catalyst. The material may be calcined in any atmosphere, reducing, oxidizing or netural, although air is preferred. However, if binders and/or lubricants are used the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying calcining and burn-out may be combined in one or two steps. Most frequently the calcining and/or burn-out steps are combined using an oxygen-containing atmosphere.

Certain other processing steps may be incorporated into the above-described procedure without deviating from the scope and intent of this invention. For example, prior to the complete drying of the catalyst, it may be extruded and then dried more completely, followed by calcination.

The final catalysts are found to have surface areas greater than about 300 m$^2$/g, pore volumes ranging from 0.4 to about 1.2 cc/g and with at least 80% of it pore volume in pores having diameters less than about 70 Å. Flat plate crush strengths are greater than about 16 lbs. In general, the metals contents of the final catalysts range from about 1%w to about 5%w cobalt, preferably from about 2.5%w to about 4%w cobalt, and from about 8%w to about 18%w, preferably about 10%w to about 14%w molybdenum or about 10%w to about 32%w, preferably about 18%w to about 26%w tungsten.

The catalysts prepared in the instant invention can be suitably applied to hydrocarbon conversion processes such as catalytic cracking, hydrocracking, hydrotreating, isomerization, hydrogenation, disproportionation, dehydrogenation, oligomerization, alkylation, dealkylation and the like.

The catalysts of the instant invention are most commonly employed in reformer pretreating, distillate hydrotreating, and vacuum gas oil processing. Reaction temperatures will typically range from about 300° F. to about 850° F., preferably from about 500° F. to about 775° F. Reaction pressures are generally within the rane of about 200 psig to about 2500 psig, preferably from about 600 psig to about 1500 psig. Reactions are conducted at liquid hourly space velocities within the range of about 0.1 to about 10 reciprocal hour.

Multiple uses of these feedstock after treating with the catalysts of this invention are possible. Depending on the particular feedstocks treated, suitable uses can include finished products and conversion unit feedstocks.

The process for preparing the catalysts of the instant invention will be further described below by the following examples which are provided for illustration and which are not to be construed as limiting the invention.

Example 1

Seven hundred and forty grams of reagent grade sodium aluminate were added to 1000 grams of water which was then heated to 60° C. in order to effect dissolution of the materials. Five hundred and forty-four grams of aluminum chloride hexahydrate were added to 760 grams of water. One hundred and twelve grams of 85% phoshporic acid along with 112 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect the titration. After these quantities of reagents had been used, the final aging pH of the solution rose to between 10.5 and 11.5. The solution was aged for one hour at 60° C. The resulting material was filtered and washed in two large Buchner funnels with about 50 liters of water. The excess water from the wet filter cake was removed by vacuum. The hydrogel was then divided into three equal portions.

The following solutions were then prepared. 38.43 grams of cobalt nitrate as hexahydrate was mixed with 24.18 grams of 85% phosphoric acid and diluted to 1000 milliliters with water. An additional solution of 58.48 grams of ammonium heptamolybdate and 11.0 grams of 30% hydrogen peroxide were diluted to 1000 milliliters with water. The two solutions were combined slowly with stirring and one portion of the hydrogel was added and reslurried with one third of the solution of 80° C. for two hours at a pH of 5.5. At the end of two hours, the slurry was filtered and washed with two liters of water. The excess water from the slurry was again removed by vacuum. The wet gel was then extruded using a small, hand-held extruder using a 0.156" cylindrical die, dried overnight at 120° C. and calcined in air at 510° C. The properties of the catalyst are listed in Tables I and II.

EXAMPLE 2

A catalyst was prepared according to Examplee 1 except that no phosphoric acid was added to metals solution. The properties of the catalyst are listed in Tables I and II.

Comparative Experiment A

A catalyst was prepared according to Example 1 except that the pH in the reslurry step was adjusted to 10.0 using ammonium hydroxide. The properties of the catalyst are listed in Tables I and II.

Comparative Experiment B

A catalyst was prepared according to Example 1 except that the pH in the reslurry step was adjusted to 2.0 using hydrochloric acid. The materials prepared in this experiment were unsuitable for testing as the alumina support dissolved when the pH was adjusted to 2.0.

Comparative Experiment C

A catalyst was prepared according to Example 1 except that no phosphorus was added in the precipitation step. The properties of the catalyst are listed in Tables I and II.

Comparative Experiment D

A catalyst was prepared using a conventional dry pore volume impregnation technique. A solution suitable for impregnating a gamma alumina carrier was prepared as follows. A first solution was made by adding 15.37 grams of cobalt nitrate and 9.67 grams of phosphoric acid to 5 milliliters of water which solution was then heated to 40° C. and stirred in order to effect dissolution of the materials. A second solution was prepared by mixing 4.0 milliliters of 30% hydrogen peroxide, 40 milliliters of distilled water and 23.39 grams of ammonium heptamolybdate. The mixture was then heated to 40° C. and stirred until all solids were dissolved. When both solutions were at or near ambient temperature, the second solution was slowly added to the first solution while stirring. After cooling and diluting to the total water pore volume of the support, the solution was added to the gamma alumina support in several small portions with intermediate agitations. The impregnated support was further agitated about 5 minutes, dried for 2 hours at 400° F. and calcined in air for 2 hours at 900° F. The properties of the catalyst are listed in Tables I and II.

Catalyst Testing

Catalyst samples were used to hydrotreat a catalytically-cracked heavy gas oil (CCHGO) in a trickle-flow reactor. Ten ccs of the extruded catalyst were crushed and sieved to a 16–45 mesh, diluted with silicon carbide, and loaded into a typical trickle-flow reactor tube. The catalyst was presulfided with a 5% $H_2S/H_2$ (v/v) gas mixture at 700° F. for 2 hours prior to testing. A CCHGO was passed over the catalyst at 650° C. and 850 psig $H_2$ with a h2/oil equal to 4.0. Rate constants are reported relative to the impregnated catalyst (Example D). Measured rate constants include hydrogenation, denitrification and desulfurization. Specific catalyst performance characteristics are presented in Table III.

TABLE I

Catalyst Properties

| | EXAMPLE 1 | EXAMPLE 2 | COMPARATIVE EXPERIMENT A | COMPARATIVE EXPERIMENT C | COMPARATIVE EXPERIMENT D |
|---|---|---|---|---|---|
| Aging pH[a] | 11.0 | 11.0 | 10.0 | 10.0 | — |
| Density g/cc[b] | 0.65 | 0.82 | 0.81 | 0.53 | 0.77 |
| Reslurry pH[c] | 5.5 | 5.5 | 10.0 | 5.5 | — |
| $N_2$ Surface Area $m^2/g$[d] | 447.0 | 384.0 | 309.0 | 388.0 | 190.0 |
| $N_2$ Pore Volume cc/g[e] | 0.56 | 0.38 | 0.48 | 0.94 | — |
| Flat Plate Crush Strength lbs.[f] | 17.0 | 18.0 | 13.0 | 12.0 | 18.0 |
| % wt. Cobalt[g] | 2.3 | 2.6 | 2.1 | 2.2 | 2.4 |
| % wt. Molybdenum[h] | 11.8 | 14.7 | 1.2 | 6.2 | 9.8 |
| % wt. Phosphorous[i] | 3.7 | 1.7 | 4.1 | 2.2 | 2.0 |

TABLE II

Catalyst Pore Size Distributions

| Hg Pore[j] Size Dist | EXAMPLE 1 | EXAMPLE 2 | COMPARATIVE EXPERIMENT A | COMPARATIVE EXPERIMENT C | COMPARATIVE EXPERIMENT D |
|---|---|---|---|---|---|
| <50 ang | 91.3 | 89.4 | 88.4 | 8.7 | 2.9 |
| 50–70 ang | 3.4 | 3.4 | 3.4 | 18.3 | 14.9 |
| 70–100 ang | 1.7 | 2.3 | 2.4 | 31.8 | 40.1 |
| 100–150 ang | 0.5 | 1.8 | 3.2 | 30.1 | 35.9 |
| 150–350 ang | 0.0 | 1.6 | 2.4 | 8.7 | 4.1 |
| >350 ang | 3.2 | 1.4 | 0.2 | 2.7 | 2.0 |

(a) Measured using an Orion 231 pH meter and Orion electrodes.

(b) 209 cc volume fully settled in a graduated cup and weighed.

(c) Measured using an Orion 231 pH meter and Orion electrodes.

(d) BET, by nitrogen adsorption/desorption, Micromeritics Digisorb 2500 Instrument.

(e) By nitrogen adsorption, Micromeritics Digisorb 2500 Instrument.

(f) Flat plate, single pellet, extrudate approximately 5 mm in length.

(g) Weight percent determined by neutron activation analysis or atomic absorption spectroscopy.

(h) Weight percent determined by neutron activation analysis or atomic absorption spectroscopy.

(i) Weight percent determined by neutron activation analysis or atomic absorption spectroscopy.

(j) Determined by mercury intrusion, to 60,000 psi using a Micromeritics Autopore 9210, using 130° contact angle and 0.473 n/m surface tension of mercury. Numbers listed are percent pore volume.

TABLE III

| Specific Catalyst Performance | | | |
|---|---|---|---|
| | CCHGO (VOLUMETRIC) | | |
| | H | N | S |
| Example 1 | 1.00 | 1.37 | 1.20 |
| Example 2 | 1.02 | 1.26 | 1.18 |
| Comparative Experiment C | 0.85 | 0.92 | 0.82 |
| Comparative Experiment D | 1.00 | 1.00 | 1.00 |

I claim as my invention:

1. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at lest about 80% of its pore volume in pores having diameters less than about 70 Å, wherein said catalyst is prepared by a process which comprises:
   (a) precipitating an aqueous solution of one or more aluminum salt(s) in the presence of a phosphorus-containing compound in an amount of from about 0.06 to about 0.30 moles of phosphorus per mole of aluminum by adjusting the pH of said solution to a range between about 5.5 and about 10.0 at a temperature in the range between about 20° C. and about 90° C.,
   (b) aging the precipitate at a temperature ranging from about 20° C. to about 90° C. for at least about 15 minutes at a pH ranging from about 8.0 to about 12.0,
   (c) washing the precipitate,
   (d) mixing the precipitate with a solution containing solubilized salts of cobalt and a heavy metal selected from the group consisting of molybdenum, tungsten and mixtures thereof, at a pH in the range between about 4.0 and about 8.0 and a temperature in the range between about 25° C. and about 100° C. until adsorption of the metal salts onto the gel is sufficient to yield a final catalyst having from about 1%w to about 5%w cobalt and from about 8%w to about 32%w heavy metal,
   (e) extruding the product of step (d), and
   (f) drying and calcining the product of step (e) at a temperature ranging from about 300° C. to about 900° C.

2. The process of claim 1 wherein the precipitation is carried out at a pH in the range between about 5.5 and about 8.0.

3. The process of claim 1 wherein the precipitation is carried out at a temperature between about 50° C. and about 85° C.

4. The process of claim 1 wherein the aging pH is in the range between about 9.0 and about 11.0.

5. The process of claim 1 wherein step (d) is carried out at a pH in the range between about 4.0 and about 6.0.

6. The process of claim 1 wherein said solution in step (d) contains solubilized salts of cobalt and molybdenum.

7. The process of claim 6 wherein said solution in step (d) additionally contains a phosphorus-containing compound in an amount of from about 0.2 to about 1.5 moles of phosphorus per mole of molybdenum.

8. The process of claim 6 wherein said catalyst contains from about 2.5%w to about 4%w cobalt and from about 8%w to about 18%w molybdenum.

9. The process of claim 1 wherein said solution in step (d) additionally contains a phosphorus-containing compound in an amount of from 0.2 to about 1.5 moles of phosphorus per mole of heavy metal.

10. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
   (a) titrating an aqueous solution of an acid aluminum salt and an aqueous solution of a basic aluminum compound in the presence of a phosphorus-containing compound in an amount of from about 0.6 to about 0.30 moles of phosphorus per mole of aluminum at a pH in the range between about 5.5 and about 10.0 and a temperature in the range between about 20° C. and about 90° C., thereby forming a precipitate,
   (b) aging the precipitate at a temperature ranging from about 20° C. to about 90° C. for at least about 15 minutes at a pH ranging from about 8.0 to about 12.0,
   (c) washing the precipitate,
   (d) mixing the precipitate with a solution containing solubilized salts of cobalt and a heavy metal selected from the group consisting of molybdenum, tungsten and mixtures thereof, at a pH in the range between about 4.0 and about 8.0 and a temperature in the range between about 25° C. and about 100° C. until adsorption of the metal salts onto the gel is sufficient to yield a final catalyst having from about 1%w to about 5%w cobalt and from about 8%w to about 32%w heavy metal,
   (e) extruding the product of step (d), and
   (f) drying and calcining the product of step (e) at a temperature ranging from about 300° C. to about 900° C.

11. The process of claim 10 wherein the precipitation is carried out at a pH in the range between about 5.5 and about 8.0.

12. The process of claim 10 wherein the precipitation is carried out at a temperature between about 50° C. and about 85° C.

13. The process of claim 10 wherein the aging pH is in the range between about 9.0 and about 11.0.

14. The process of claim 10 wherein step (d) is carried out at a pH in the range between about 4.0 and about 6.0.

15. The process of claim 10 wherein said solution in step (d) contains solubilized salts of cobalt and molybdenum.

16. The process of claim 15 wherein said solution in step (d) additionally contains a phosphorus-containing compound in an amount of from about 0.2 to about 1.5 moles of phosphorus per mole of molybdenum.

17. The process of claim 15 wherein said catalyst contains from about 2.5%w to about 4%w cobalt and from about 8%w to about 18%w molybdenum.

18. The process of claim 10 wherein said solution in step (d) additionally contains a phosphorus-containing compound in an amount of from 0.2 to about 1.5 moles of phosphorus per mole of heavy metal.

19. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
(a) titrating an aqueous solution of an acid aluminum salt and phosphoric acid in an amount of from about 0.06 to about 0.30 moles of phosphorus per mole of aluminum with an aqueous solution of a basic aluminum compound at a pH in the range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with a solution containing solubilized salts of cobalt and a heavy metal selected from the group consisting of molybdenum, tungsten and mixtures thereof, at a pH in the range between about 4.0 and about 8.0 and a temperature in the range between about 25° C. and about 100° C. until adsorption of the metal salts onto the gel is sufficient to yield a final catalyst having from about 1%w to about 5%w cobalt and from about 8%w to about 32%w heavy metal,
(e) extruding the product of step (d), and
(f) drying and calcining the product of step (e) at a temperature ranging from about 300° C. to about 900° C.

20. The process of claim 19 wherein the precipitation is carried out at a pH in the range between about 5.5 and about 8.0.

21. The process of claim 19 wherein the precipitation is carried out at a temperature between about 50° C. and about 85° C.

22. The process of claim 19 wherein the aging pH is in the range between about 9.0 and about 11.0.

23. The process of claim 19 wherein step (d) is carried out at a pH in the range between about 4.0 and 6.0.

24. The process of claim 19 wherein said solution in step (d) contains solubilized salts of cobalt and molybdenum.

25. The process of claim 24 wherein said solution in step (d) additionally contains a phosphorus-containing compound in an amount of from about 0.2 to about 1.5 moles of phosphorus per mole of molybdenum.

26. The process of claim 24 wherein said catalyst contains from about 2.5%w to about 4%w cobalt and from about 8%w to about 18%w molybdenum.

27. The process of claim 19 wherein said solution in step (d) additionally contains a phosphorus-containing compound in an amount of from about 0.2 to about 1.5 moles of phosphorus per mole of heavy metal.

28. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
(a) titrating an aqueous solution of an acid aluminum salt with an aqueous solution of a basic aluminum compound and sodium phosphate in an amount of from about 0.06 to about 0.30 moles of phosphorus per mole of aluminum at a pH in the range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate
(d) mixing the precipitate with a solution containing solubilized salts of cobalt and a heavy metal selected from the group consisting of molybdenum, tungsten and mixtures thereof, at a pH in the range between about 4.0 and about 8.0 and a temperature in the range between about 25° C. and about 100° C. until adsorption of the metal salts onto the gel is sufficient to yield a final catalyst having about 1%w to about 5%w cobalt and from about 8%w to about 32%w heavy metal,
(e) extruding the product of step (d), and
(f) drying and calcining the product of step (e) at a temperature ranging from about 300° C. to about 900° C.

29. The process of claim 28 wherein the precipitation is carried out at a pH in the range between about 5.5 and about 8.0.

30. The process of claim 28 wherein the precipitation is carried out at a temperature between about 50° C. and about 85° C.

31. The process of claim 28 wherein the aging pH is in the range between about 9.0 and about 11.0.

32. The process of claim 28 wherein step (d) is carried out at a pH in the range between about 4.0 and about 6.0.

33. The process of claim 28 wherein said solution in step (d) contains solubilized salts of cobalt and molybdenum.

34. The process of claim 33 wherein said solution in step (d) additionally contains a phosphorus-containing compound in an amount of from about 0.2 to about 1.5 moles of phosphorus per mole of molybdenum.

35. The process of claim 33 wherein said catalyst contains from about 2.5%w to about 4%w cobalt and from about 8%w to about 18%w molybdenum.

36. The process of claim 28 wherein said solution in step (d) additionally contains a phosphorus-containing compound in an amount of from about 0.2 to about 1.5 moles of phosphorus per mole of heavy metal.

37. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
(a) titrating an aqueous solution of an acid aluminum salt selected from the group consisting aluminum sulfate, aluminum nitrate and aluminum chloride, and an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with a solution containing solubilized cobalt salts and molybdate or dimolybdate salts, at a pH in the range between about 4.0 and about 6.0 and a temperature in the range between about 25° C. and about 100° C. until adsorption of the metal salts onto the gel is sufficient to yield a final catalyst having from about 2.5%w to about 4%w cobalt and from about 10%w to about 14%w molybdenum,
(e) extruding the product of step (d), and
(f) drying and calcining the product of step (e) at a temperature ranging from about 300° C. to about 900° C.

38. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
(a) titrating an aqueous solution of an acid aluminum salt selected from the group consisting of aluminum sulfate, aluminum nitrate and aluminum chloride, and an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with a solution containing solubilized cobalt salts and molybdate or dimolybdate salts, and a phosphorus-containing compound in an amount of from about 0.2 to about 1.5 moles of phosphorus per mole of molybdenum, at a pH in the range between about 4.0 and about 6.0 and a temperature in the range between about 25° C. and about 100° C. until adsorption of the metal salts onto the gel is sufficient to yield a final catalyst having from about 2.5%w to about 4%w cobalt and from about 10%w to about 14%w molybdenum,
(e) extruding the product of step (d), and
(f) drying and calcining the product of step (e) at a temperature ranging from about 300° C. to about 900° C.

39. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
(a) precipitating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum at a pH in the range between about 5.5 and about 8.0 and a temperature in the range between about 20° C. and about 90° C.,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with a solution containing solubilized cobalt salts and molybdate or dimolybdate salts at a pH in the range between about 4.0 and about 6.0 and a temperature in the range between about 25° C. and about 100° C. until adsorption of said salts onto the gel is sufficient to yield a final catalyst having from about 2.5%w to about 4%w cobalt and from about 10%w to about 14%w molybdenum,
(e) extruding the product of step (d), and
(f) drying and calcining the product of step (e) at a temperature ranging from about 300° C. to about 900° C.

40. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m²/g and at least about 80% of its pore volume in pores having diameters less than about 70 Å, wherein said catalyst is prepared by a process which comprises:
(a) precipitating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum at a pH in the range between about 5.5 and about 8.0 and a temperature in the range between about 20° C. and about 90° C.,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with a solution containing solubilized cobalt salts and molybdate or dimolybdate salts, at a pH in the range between about 4.0 and about 6.0 and a temperature in the range between about 25° C. and about 100° C. until adsorption of said salts onto the gel is sufficient to yield a final catalyst having from about 2.5%w to about 4%w cobalt and from about 10%w to about 14%w molybdenum,
(e) extruding the product of step (d), and
(f) drying and calcining the product of step (e) at a temperature ranging from about 300° C. to about 900° C.

41. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m$^2$/g and at least about 80% of its pore volume in pores having diameters less than about 70 Å, wherein said catalyst is prepared by a process which comprises:

- (a) precipitating an aqueous solution of an acid aluminum salt selected from the group consisting of aluminum sulfate, aluminum nitrate and aluminum chloride, and an aqueous solution of a base in the presence of a phosphorus-containing compound in an amount of from about 0.06 to about 0.30 moles of phosphorus per mole of aluminum at a pH in the range between about 5.5 and about 8.0 and a temperature in the range between about 20° C. and about 90° C.,
- (b) aging the precipitate at a temperature ranging from about 20° C. to about 90° C. for at least about 15 minutes at a pH ranging from about 9.0 to about 11.0,
- (c) washing the precipitate,
- (d) mixing the precipitate with a solution containing solubilized cobalt salts and molybdate or dimolybdate salts, and a phosphorus-containing compound in an amount of from about 0.2 to about 1.5 moles of phosphorus per mole of molybdenum, at a pH in the range between about 4.0 and about 6.0 and a temperature in the range between about 25° C. and about 100° C. until adsorption of said salts onto the gel is sufficient to yield a final catalyst having from about 2.5%w to about 4%w cobalt and from about 10%w to about 14%w molybdenum,
- (e) extruding the product of step (d), and
- (f) drying and calcining the product of step (e) at a temperature ranging from about 300° C. to about 900° C.

42. A process for hydrotreating hydrocarbon feeds by contacting said feeds at a temperature in the range of from about 300° F. to about 850° F. and a pressure in the range of from about 200 psig to about 2500 psig with a hydrotreating catalyst which has a surface area above about 300 m$^2$/g and at least about 80% of its pore volume in pores having diameters less than about 70 Å, wherein said catalyst is prepared by a process which comprises:

- (a) precipitating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum at a pH in the range between about 5.5 and about 8.0 and a temperature in the range between about 20° C. and about 90° C.,
- (b) aging the precipitate at a temperature ranging from about 20° C. to about 90° C. for at least about 15 minutes at a pH ranging from about 9.0 to about 11.0,
- (c) washing the precipitate,
- (d) mixing the precipitate with a solution containing solubilized cobalt salts and molybdate or dimolybdate salts, and a phosphorus-containing compound in an amount of from about 0.2 to about 1.5 moles of phosphorus per mole of molybdenum, at a pH in the range between about 4.0 and about 6.0 and a temperature in the range between about 25° C. and about 100° C. until adsorption of said salts onto the gel is sufficient to yield a final catalyst having from about 2.5%w to about 4%w cobalt and from about 10%w to about 14%w molybdenum,
- (e) extruding the product of step (d), and
- (f) drying and calcining the product of step (e) at a temperature ranging from about 300° C. to about 900° C.

* * * * *